July 7, 1931.  J. KESSLER  1,813,670

PAN FOR KEEPING PAINT BRUSHES SOFT AND READY FOR USE

Filed March 1, 1929

INVENTOR
JUSTUS KESSLER
BY
Geo. L. Wheelock
ATTORNEY

Patented July 7, 1931

1,813,670

UNITED STATES PATENT OFFICE

JUSTUS KESSLER, OF HACKENSACK, NEW JERSEY

PAN FOR KEEPING PAINT BRUSHES SOFT AND READY FOR USE

Application filed March 1, 1929. Serial No. 343,773.

This invention relates to means adapted to assist a painter and others in keeping paint brushes soft and ready for use. A particular object of the invention is to keep the bristles of paint brushes in proper condition so that the bristles will not be all set or bent out of shape, while at the same time keeping the bristle portion of the brush soft and ready for use as above stated.

Another object of the invention is to provide means within a suitable liquid containing pan, for supporting paint brushes in inclined position in the pan, such liquid consisting of a suitable solvent such as water, turpentine, linseed oil, benzine or kerosene, depending upon the kind of paint or varnish used with the brushes.

Another object of the invention is to provide means for supporting paint brushes in inclined position upon a suitable strainer, which allows the paint or varnish adhering to the bristles of the brushes to drain off to the bottom of the pan at points below the strainer.

These being among the objects of the present invention the same consists of certain features of construction and combinations of parts to be hereinafter described and then claimed with reference to the accompanying drawings illustrating a preferred embodiment of the invention, in which:

Figure 1:
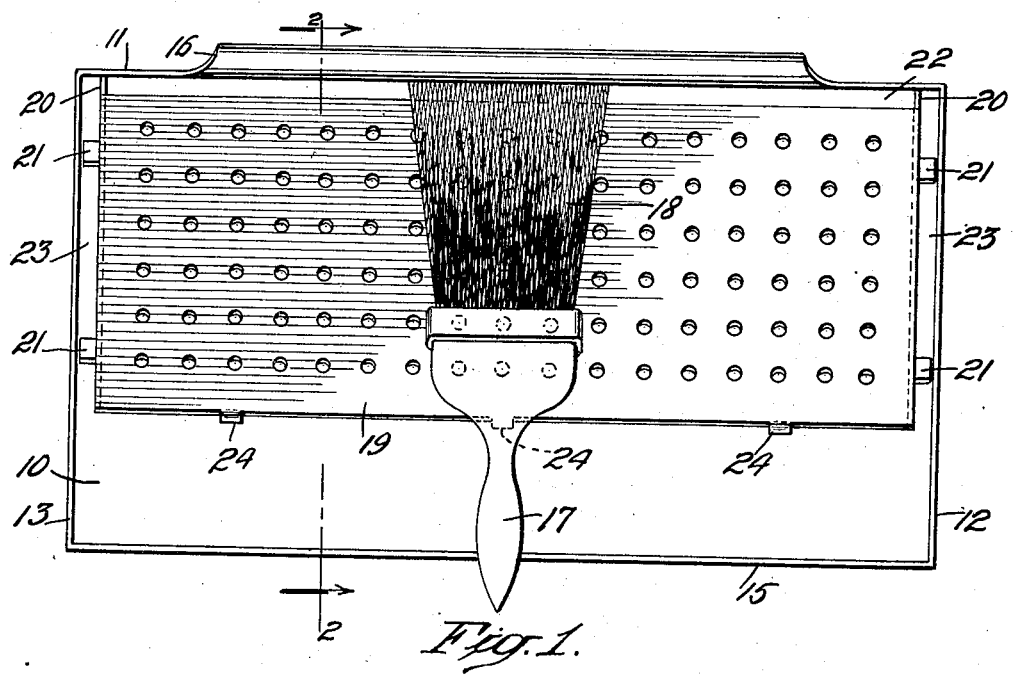
Figure 1 is a top plan of the pan showing a brush supported therein.

Referring to the drawings, the pan 10 may be of any suitable shape, but is preferably shaped transversely of the pan in the nature of a trapezoid. To this end the pan is provided with a back wall 11 and end walls 12, 13, together with an inclined bottom wall 14 and a low front wall 15. The pan is preferably of oblong form in plan, and the boundary walls 11, 12, 13 and 15 stand vertically, the bottom wall 14 being inclined upwardly from the back wall 11 at say 25 to 35 degrees.

Thereby the pan is made to gradually become deeper from the low front wall 15 towards the back wall 11.

Figure 2:
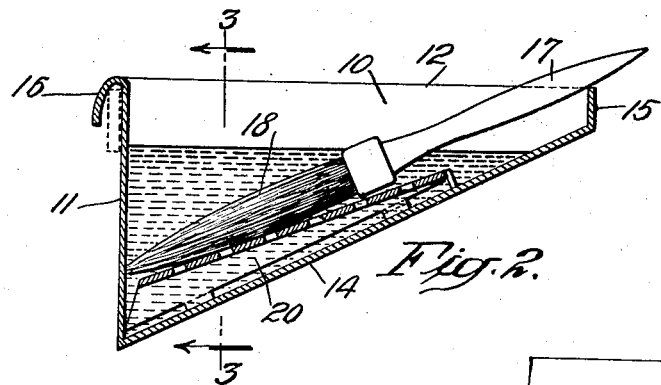
Fig. 2 is a transverse section on the line 2—2, Fig. 1, showing a brush supported in liquid held by the pan.
Figure 3:
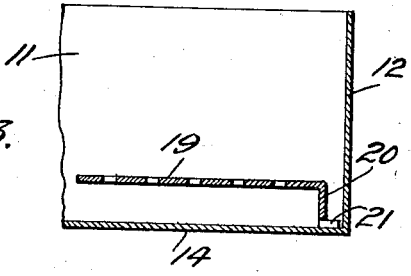
Fig. 3 is a detail section on the line 3—3, Fig. 2, to more clearly show the construction of the strainer.

The upper portion of the back wall 11 may be provided with suitable means such as a hook or hooks 16, whereby the hook may be engaged with a suitable horizontal support shown in broken lines in Fig. 2, whereby to support the pan so that its upper portion will extend out horizontally, that is the border walls will extend vertically, the bottom being thus maintained at the desired inclination.

The pan may be of metal or any other suitable material adapted to contain a body of water, turpentine, linseed oil, benzine or kerosene, depending upon the kind of paint or varnish with which the brushes have been used. The body of liquid is indicated in Fig. 2 and it is not necessary to fill the pan with the same, for preferably the proportions of the pan, with reference to the brushes which are to be soaked therein, are such that when a brush handle 17 rests upon the supporting lip provided by the wall 15, the bristle portion 18 of the brush will extend in inclined position below the surface of the liquid. Consequently the top of the liquid is below the front wall or supporting lip 15, the amount of liquid used being thus reduced to a minimum. The lip 15 supports a brush handle 17 at such inclination that the bristle portion 18 of the brush may be supported at a suitable inclination above, or even on the bottom, of the pan, such inclination overcoming the objection to the usual method of soaking brushes by standing them upright in the solvent liquid, which results in getting the bristles all out of shape, due to the weight of the brush, whereas under the present invention the objections due to imposing the weight of a brush on the ends of the bristles are removed.

Preferably a brush is supported in the pan by resting the bristle portions 18 thereof upon a strainer which is inclined more or less similarly to the inclined pan bottom 14. It will become obvious herefrom that when the strainer is inclined so as to rest the brush handles in proper position upon the lip 15, in some cases the pan bottom may be modified if it only supports the strainer in suitable inclined position. The strainer preferably comprises a perforated body 19 of sheet metal provided with down turned end flanges 20 and provide with feet 21, whereby the perforated body 19 is supported in spaced relation to the pan bottom 14. The flanges 20 preferably extend rearwardly beyond the rear edge of the plate body 19, whereby to provide a back space or longitudinal opening 22. The out-turned feet 21 space the flanges 20 of the strainer away from the end walls 12, 13 so that the spaces 23 are provided also at the ends of the strainer, the spaces 22, 23 and the perforations of the strainer permitting the heavy paint or varnish soaked out of the brush to gravitate below the perforated body 19, into the free bottom portion of the pan, so that the bristle portion of a brush is kept out of contact with the thick paint or varnish which has been soaked out of the brush, and which goes into the space below the plate body 19.

At the front of the strainer it is provided with feet 24, if desired, so as to provide a space or gap below the front edge of the strainer, through which paint scraped off on the lip 15 may run below the perforated body 19 out of contact with the bristles of the brushes which are supported in the pan. The strainer is preferably made removable from the pan so that it and the pan may be separately cleaned when necessary. It is clear that by reason of the preferred construction shown and described, paint brushes may be soaked while lying flat or in such position in suitable solvent liquids as to keep the brushes well soaked over night or at any other time, and keep the bristles in the required more or less straight condition without being turned up and forced out of shape by the weight of the brush.

What I claim as new, is:

1. In a device of the class described, the combination of a pan having a bottom upwardly inclined from the horizontal, means at the front of the pan for supporting the handle of a paint brush, and an inclined strainer resting on the bottom for flatly supporting the bristles of the brush at an angle substantially less than forty-five degrees and cooperating with the front supporting means for supporting the entire brush in substantial contact with the strainer and the front supporting means.

2. In a device of the class described, the combination of a pan having a bottom upwardly inclined from the horizontal, means at the front of the pan for supporting the handle of a paint brush, and an inclined strainer resting on the bottom for supporting the bristles of the brush, and means for providing clearance between the edges of the strainer and the adjacent walls of the pan.

3. In a device of the class described, the combination of a pan having means for contacting with a paint brush handle, and a strainer in the pan and inclined upwardly toward the contacting means, the strainer inclination being substantially less than forty-five degrees, whereby it is adapted to support the brush bristles substantially throughout their length in downwardly extending position.

4. In a device of the class described, the combination of a pan having means for contacting with a paint brush handle, a strainer in the pan and inclined upwardly toward the contacting means, the strainer inclination being substantially less than forty-five degrees, whereby it is adapted to support the brush bristles in downwardly extending position, and means for providing clearance between the edges of the strainer and the adjacent walls of the pan, the strainer comprising a perforated body having legs resting on the bottom of the pan.

5. In a device of the class described, the combination of a pan having a bottom upwardly inclined from the horizontal, means at the front of the pan for supporting the handle of a brush, an inclined strainer spaced above and resting on the bottom for supporting the bristles of the brush, and above the bottom being free from obstructions, and thereby adapted to permit free flow of the paint from the brush and strainer into the space below the strainer, and means for providing clearance between the edges of the strainer and the adjacent walls of the pan.

JUSTUS KESSLER.